United States Patent
Ridley et al.

(10) Patent No.: US 8,135,286 B2
(45) Date of Patent: Mar. 13, 2012

(54) METHOD OF PROVIDING DUPLEX OPTICAL COMMUNICATIONS AND OPTICAL MODULATOR THEREFOR

(75) Inventors: Kevin Dennis Ridley, Worcestershire (GB); Andrew Maxwell Scott, Worcestershire (GB); Steven Matthew Stone, Worcestershire (GB); Andrew Charles Lewin, Worcestershire (GB)

(73) Assignee: Qinetiq Limited (GB)

( * ) Notice: Subject to any disclaimer, the term of this patent is extended or adjusted under 35 U.S.C. 154(b) by 804 days.

(21) Appl. No.: 12/090,317

(22) PCT Filed: Oct. 19, 2006

(86) PCT No.: PCT/GB2006/003884

§ 371 (c)(1),
(2), (4) Date: Apr. 15, 2008

(87) PCT Pub. No.: WO2007/045872

PCT Pub. Date: Apr. 26, 2007

(65) Prior Publication Data

US 2008/0260380 A1  Oct. 23, 2008

(30) Foreign Application Priority Data

Oct. 19, 2005 (GB) .................................. 0521248.5

(51) Int. Cl.
*H04B 10/04* (2006.01)
*G02B 5/18* (2006.01)
*G01N 21/41* (2006.01)

(52) U.S. Cl. .......................... 398/183; 398/169; 398/170

(58) Field of Classification Search ........... 398/169–170
See application file for complete search history.

(56) References Cited

U.S. PATENT DOCUMENTS

| | | | |
|---|---|---|---|
| 4,955,086 A * | 9/1990 | Kindt | 398/170 |
| 5,408,350 A | 4/1995 | Perrier et al. | |
| 6,778,779 B1 | 8/2004 | Shay et al. | |
| 6,839,172 B1 * | 1/2005 | Motamedi et al. | 359/571 |
| 2002/0186141 A1 | 12/2002 | Jen et al. | |
| 2003/0072050 A1 | 4/2003 | Vrazel et al. | |
| 2003/0142741 A1 * | 7/2003 | Hartmann | 375/239 |
| 2004/0075880 A1 | 4/2004 | Pepper et al. | |

(Continued)

FOREIGN PATENT DOCUMENTS

FR  2 558 025  7/1985

(Continued)

OTHER PUBLICATIONS

Gao, "Optical Retroreflector-based Sensor Networks for In-Situ Science Applications", Aerospace Conference, 2003, Proceedings, 2003 IEEE Mach 8-15, vol. 3, pp. 31295-31302 (2003).

(Continued)

*Primary Examiner* — Danny Leung

(74) *Attorney, Agent, or Firm* — McDonnell Boehnen Hulbert & Berghoff LLP

(57) ABSTRACT

Methods of providing duplex free-space optical, communication comprising receiving a time-shift keying (TSK) encoded signal and selectively re-modulating—and optionally retro-reflecting—received TSK pulses so as to transmit an on-off keying (OOK) signal wherein modulation is achieved by operating a micro-opto-electronic mechanical system (MOEMS) device having a oscillation period, the difference in timing between logic 1 and logic 0 pulses of the TSK encoded signal being such that each pulse arrives at a time within a single MOEMS device oscillation period chosen to ensure high or low transmissivity through the MOEMS device independent of incident TSK encoded signal pulse value (0 or 1).

14 Claims, 12 Drawing Sheets

U.S. PATENT DOCUMENTS

2005/0024629 A1* 2/2005 Pike ............................ 356/128
2006/0215147 A1 9/2006 Scott

FOREIGN PATENT DOCUMENTS

GB 2 196 809 5/1988

OTHER PUBLICATIONS

Shay, et al., "The First Experimental Demonstration of Full-Duplex Communications on a Single Laser Beam", Proceedings of the SPIE, vol. 5160, pp. 265-271 (2004).

* cited by examiner

Displacement Magnitude 0.00  0.10  0.20  0.30  0.40

METHOD OF PROVIDING DUPLEX OPTICAL COMMUNICATIONS AND OPTICAL MODULATOR THEREFOR

FIELD OF THE INVENTION

The present invention relates to apparatus, methods, signals and other related aspects for optical communications and in particular, though not exclusively, free-space optical communications, and systems incorporating the same.

BACKGROUND TO THE INVENTION

The potential of free-space optical communication systems is well established as a means of providing high bandwidth data links between two points on a line of sight basis. Such systems are being considered for a number of applications, including as elements of communication links in metropolitan areas and for local area networks in open plan offices.

Co-pending patent application U.S. patent application Ser. No. 10/483,738 (A. M. Scott et al.) discloses a dynamic optical reflector and interrogation system employing a combination of spacing-controllable etalon and a retro-reflector arranged to reflect light received via the etalon back through the etalon towards the light source.

OBJECT OF THE INVENTION

The invention seeks to provide improved methods, apparatus, and signals for optical communication in general and in particular free-space optical communication.

SUMMARY OF THE INVENTION

According to a first aspect of the present invention there is provided a method of providing duplex optical communication comprising receiving a time-shift keying encoded signal and selectively modulating received pulses so as to transmit an on-off signal.

The modulator may selectively transmit received pulses.

The transmitted pulses may be retro-reflected.

The invention also provides for a system for the purposes of communications which comprises one or more instances of apparatus embodying the present invention, together with other additional apparatus.

In particular, according to a further aspect of the present invention there is provided an optical signal modulator comprising a selectively transmissive element arranged, in operation, to selectively modulate successive pulses of an incident time-shift keying encoded signal whereby to provide an on-off encoded signal.

The optical modulator may comprise a retro-reflector arranged to selectively retro-reflect the successive pulses.

The modulator may comprise a reflector to reflect modulated successive pulses.

The reflector may be a retro-reflector.

The invention is also directed to signals employed by the other aspects of the invention.

In particular, according to a further aspect of the present invention there is provided an optical communications signal comprising an on-off pulse encoded signal generated responsive to a second time-shift keying encoded optical signal, the on pulses of the signal exhibiting time-shift characteristics of the second time-shift keying encoded optical signal.

According to a further aspect of the present invention there is provided a compound optical signal, comprising a first time-shift keying encoded signal and a second on-off encoded signal, pulses of the on-off signal being time-delayed derivatives of corresponding pulses of the first time-shift keying encoded signal, the pulses of the on-off signal thereby exhibiting time-shift characteristics derived from those of the first time-shift keying encoded signal.

The invention also provides for computer software in a machine-readable form and arranged, in operation, to control or carry out every function of the apparatus and/or methods.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1A:
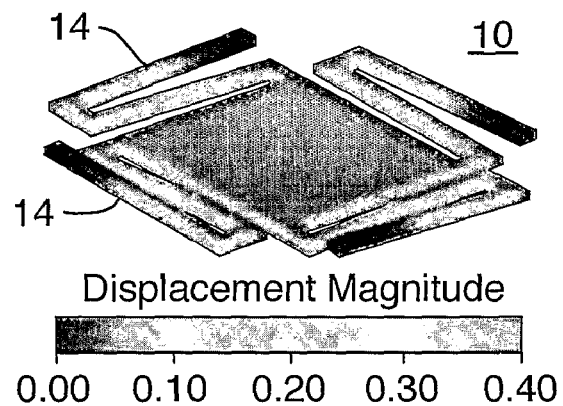
FIG. 1(a) shows a perspective view of a typical micro-mirror element and typical spring structures in accordance with the present invention (substrate not shown)
Figure 1B:
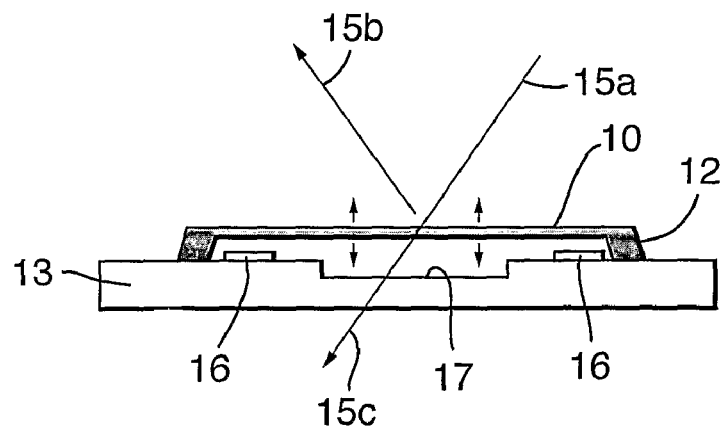
FIG. 1(b) shows a side view of the micro-mirror element and typical spring structures according to the present invention
Figure 1C:
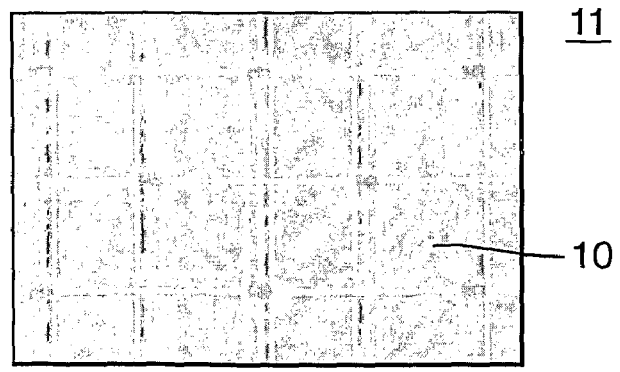
FIG. 1(c) shows a plan view of an array of micro-mirror elements according to the present invention.

Referring to FIGS. 1(a-c) a modulator that may be used for controlling the intensity of a beam (or beams) of light is based on a single element 10 or an array 11 of MOEMS mirror structures in which one or more micro-mirrors 10 are suspended 12 above a substrate 13. This arrangement may be used in transmission for wavelengths where the substrate (for example silicon) is optically transmissive, and may be used in reflection for a substantially larger range of wavelengths.

An individual element comprises a micro-mirror 10 which is suspended above a substrate 13 by a distance of between a fraction of a micron and a few microns. The micro-mirror is supported by springs 14, so that when a voltage is applied between the substrate and the micro-mirror, electrostatic forces will pull the micro-mirror from an equilibrium position (without voltage applied) towards the substrate.

In voltage-actuated electrostatic devices, below a given threshold the electrostatic force balances the mechanical restoring force due to the device displacement and the device is in a stable equilibrium condition. Above this threshold, the device becomes unstable as the electrostatic force exceeds the restoring force and the micro-mirror moves uncontrollably towards the substrate—a condition commonly known as "latch", "pull-in" or "pull-down". Applying a voltage above the threshold enables a larger range of mirror motion for a given drive voltage—typically by a factor of approximately 3 over a sub-threshold regime. The micro-mirror may be any shape in plan form but is should be substantially flat and parallel to the substrate. The micro-mirror may conveniently be square but may also be of other shapes. Shapes which afford close packing in an array are particularly preferred: for example triangular, rectangular, and hexagonal.

When light 15a is directed onto this device, some of the light will be reflected 15b and some will be transmitted 15c to the substrate and out the other side (for the case of wavelengths such that the substrate is transparent). Light reflected and transmitted by the suspended mirror will interfere with light reflected and transmitted by the substrate, and the actual transmission and reflection of the device will vary between a high and a low value depending on the angle of incidence of the light upon the device, on the spacing between the suspended mirror and the substrate, and on other pre-determined characteristics of the system such as the thickness of the suspended micro-mirror, the refractive index of the material from which the micro-mirror is made, and the wavelength of the incident light.

In operation, as the spacing between micro-mirror and substrate changes, the transmission varies between a high and low value, providing a means of modulation of the incident light. The modulation can work in transmission or reflection modes. It is noted that the micro-mirror is typically a fraction of a micron thick and will be semi-transparent even in the visible region where silicon is highly absorbing, so a modulator made from silicon can be used in reflection for the visible band. Materials other than silicon, for example silicon dioxide or silicon nitride may also be used as would be apparent to the skilled person. In this case the substrate would be required to be transparent (and might for example be silicon dioxide or silicon nitride, and the micro-mirror and bottom layer would be silicon dioxide or silicon nitride or a thin layer of silicon or a combination of materials.

The transmission and reflection properties of the modulator can be described by using the known formulae for transmission and reflection by a Fabry-Perot etalon, as given in equation 2 of this document. It is noted that the reflected and transmitted light experiences a phase shift as well as a change in amplitude. This can also be used in a device which is required to modulate the phase of a beam of light.

When the micro-mirrors are produced as an array with an extended area covered by a tiling of closely packed mirrors, it becomes a Spatial Light Modulator (SLM). In an SLM the micro-mirrors may be controlled individually, in groups, or all together. Preferably the elements of the micro-mirror array are arranged or operated to move coherently: that is they are arranged to move synchronously with the same timing and amplitude, so that the resulting phase of light across the array is uniform; for the groups of multiple micro-mirrors, and possibly all, elements move together, to create a substantially uniform effect on parts of the wavefront incident upon the device. This has the benefit that the diffraction properties of the modulated light are determined by the extended wavefront and not by the diffraction by a single micro-mirror element. An array of small mirrors enables high speeds to be reached whilst maintaining good mirror flatness when compared to larger devices.

The micro-mirrors are each actuated between two stable positions in which one can be confident of ensuring the mirror is located when being controlled using two voltage states. The first of these is an 'equilibrium position' in which the micro-mirror 10 is suspended at rest above the substrate when no voltage (or a voltage below a given threshold) is applied between the mirror and the substrate. In embodiments in which no voltage is applied there is no extension of the support springs 14. In an alternative embodiment, a sub-threshold voltage is applied to reduce overall modulator power consumption by recharging a power cell when the state of the modulator is changed. The mirror will settle to a lower equilibrium position as the electrostatic and mechanical forces balance between the original equilibrium position (no voltage applied) and the substrate.

The second is the "pull-down" position in which the applied voltage exceeds the threshold, causing the micro-mirror to be pulled firmly down towards the substrate.

Insulating stops (for example bosses or other raised electrically insulating features) 16 may be provided between the substrate and the micro-mirror so that when the voltage exceeds the threshold value the mirror is pulled hard against the stops but cannot be pulled any further towards the substrate. These pull-down stops thereby prevent undesirable electrical contact between the micro-mirror and the substrate, since electrical contract would lead to a short circuit and electrical damage. Moreover, incorporating one or more end stops enables a pre-defined offset between the mirror and the substrate to be defined when in the pull-down position. Additionally, they provide mechanical damping, speeding the settling time. Advantageously, this offset may be specifically designed to correspond to a low transmission state over a wide angular range. Preferably the end stops are arranged to enable a small degree of bow to be built into the mirror in the pull-down position to provide additional energy to overcome any adhesion energy in the mechanical contact. In one possible embodiment, a substantially square or rectangular mirror incorporates end stops at or close to each corner of the mirror and at or close to the centre of the mirror.

The mirrors may be realised using a MEMS process, preferably a polysilicon surface micromachining process. Preferably, the end stops are realised using one or more bushes 16 (insulated islands) on the substrate and a dimple 17 under the mirror. More preferably the bushes may comprise silicon nitride and/or polysilicon and the mirror and dimple comprise polysilicon.

When a small voltage is applied to the micro-mirror, it will move a small amount from its equilibrium position. When the voltage exceeds a certain threshold, the motion becomes unstable, and the micro-mirror will snap down to the 'pull-down position'. It is difficult to apply an analogue control voltage to make the micro-mirror move to an arbitrary distance from the substrate, requiring fine control over the voltage and being susceptible to any voltage drops due to track length differences between mirrors in an array. In normal or simple control systems, one can only move the micro-mirror about one third of the way between the equilibrium position and the pull-down position under analogue control; thereafter the micro-mirror will dynamically move fully to the pull-down position. In practice this snap-down position is preferred in the present invention in which it is preferred to switch the micro-mirror between the equilibrium position and the pull-down position using two discrete voltage states.

When the micro-mirror is subjected to a force resulting from an applied voltage signal, the motion is determined by the mechanical resonance frequency of the mirror and the damping effect of the atmosphere. The mirror together with its spring system behaves as a classical resonator, with a resonant frequency which can be determined by conventional commercially available software tools. The precise resonant frequency for a given arrangement will depend on the strength of the spring and the mass of the mirror and the degree of damping. For typical structures of, for example, two straight springs and a mirror size of 25 micron×25 microns, this resonant frequency may be of the order of 300 kHz. Larger mirrors may have substantially lower resonant frequencies. Devices with stiffer springs may have substantially higher resonant frequencies.

At atmospheric pressure and at pressures down to a few tens of millibar, air causes the motion of the micro-mirrors to be heavily damped, and the time taken to change between states is dominated by this damping process. At a pressure of a few millibar or less, the micro-mirror behaves as a high-Q resonator: that is, it moves in a strongly oscillatory manner. This oscillation is not exhibited when the mirror is pulled down and held against the pull-down stops since they provide mechanical damping, but is evident when the micro-mirror is released from its pull-down position by switching the applied voltage to zero (or otherwise below the threshold required to retain it in the pull-down position).

When a micro-mirror is released in a vacuum, it will spring up towards its equilibrium position, and subsequently oscillate about this position, returning to close to the pull-down position after each cycle. This may be very weakly damped, and the motion will then proceed in a very predictable fashion in which the amplitude and the frequency are relatively independent of the precise degree of vacuum or the absolute voltage that was used initially to hold the micro-mirror down.

The displacement of the micro-mirror above the substrate is given by:

$$x(t) = x_0 - (x_0 - x_1)\cos(\Omega t)\exp(-\beta t) \quad (1)$$

where x is the distance from the substrate to the micro-mirror, $x_0$ is the equilibrium position, $x_1$ is the pull-down position, t is the time from release of the micro-mirror, $\Omega$ is the resonant frequency, and $\beta$ is the damping coefficient.

Figure 2:
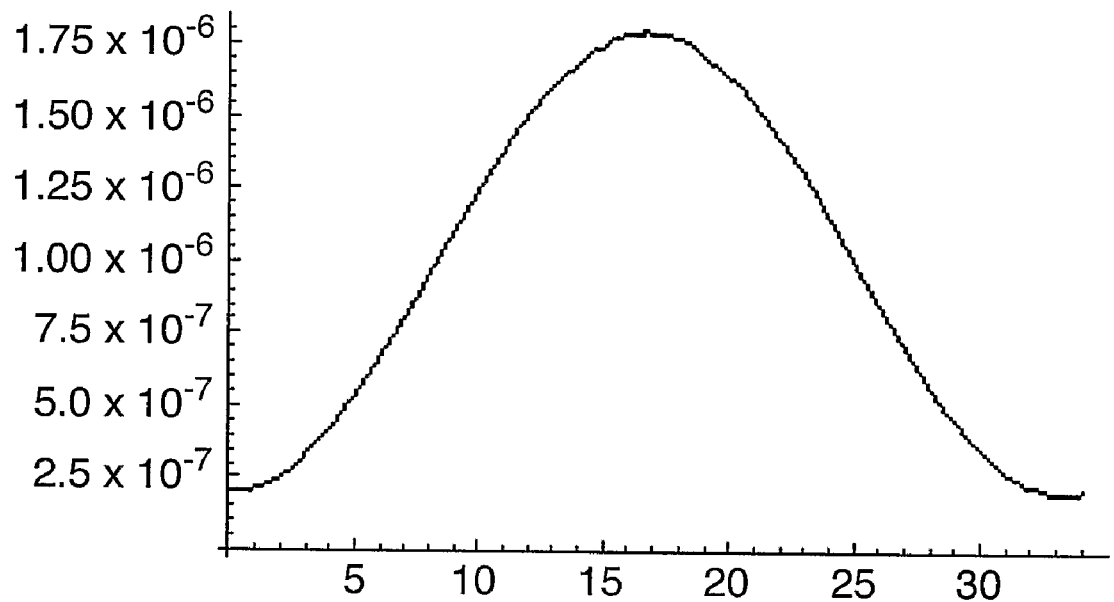
FIG. 2 shows a schematic graph of separation between micro-mirror and substrate versus time according to the present invention.

At low pressure the oscillation has a low damping coefficient and will exhibit an overshoot, so that for a maximum required plate separation (between micro-mirror and substrate) of 1.5 microns, for example, it is possible to design the equilibrium position to be close to 0.75 microns and rely on the overshoot to achieve the required maximum separation. The full range of plate separations is addressed in the first half cycle as the etalon moves from minimum to maximum separation from the substrate. After a time between a half period and a full period, the substrate voltage is reapplied, and as the plate continues the oscillation it moves back towards the substrate, where the micro-mirror is recaptured by the applied field and returns to the initial 'pull down' position. A typical plate separation with respect to time over one cycle is as shown in FIG. 2, in which the horizontal axis denotes time (in arbitrary units) and the vertical axis shows displacement of the micro-mirror from the substrate. The equilibrium position in the example shown is 1 micron. One may alternatively allow the micro-mirror to make a pre-determined number (1, 2, 3, or more) of oscillations and then re-apply the voltage to recapture the micro-mirror in the pull-down position.

Figure 3A:
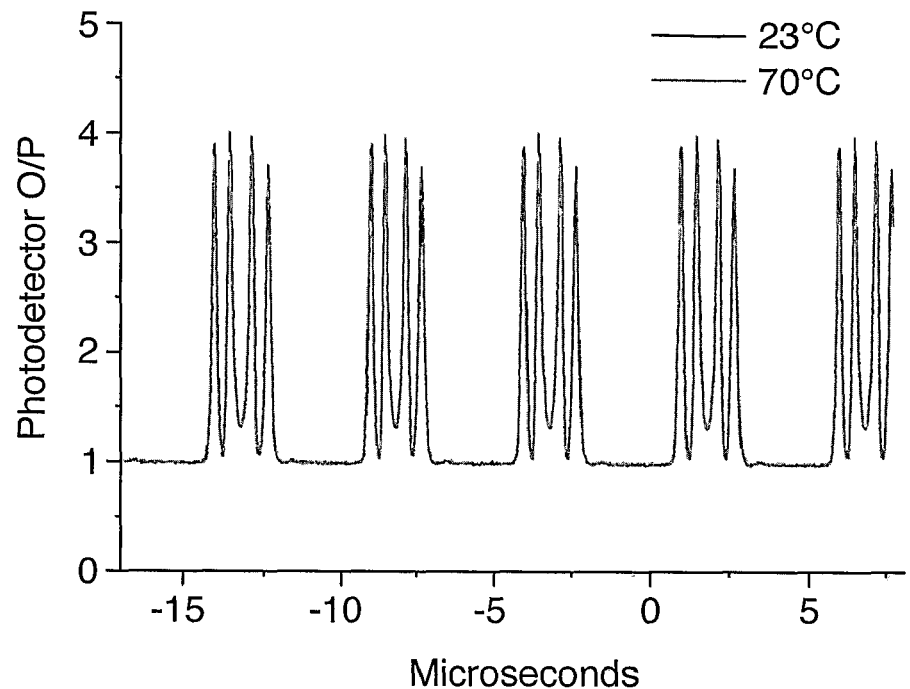
FIG. 3(a) shows a schematic graph of transmission characteristics of an optical modulator according to the present invention for a normal angle of incidence.
Figure 3B:
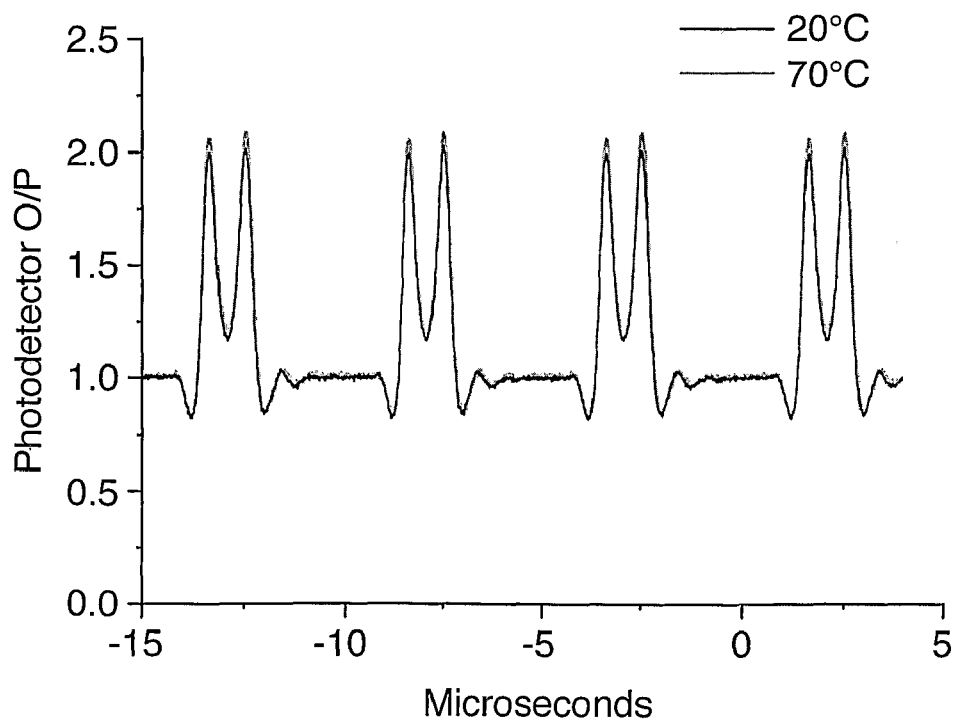
FIG. 3(b) shows a schematic graph of transmission characteristics of an optical modulator according to the present invention for a 60 degree angle of incidence.

By controlling the release timing of the micro-mirror in this way, control of the mirror position across the whole range of motion may be made dependent on timing control rather than fine voltage control. Such fine control of timing may be achieved using high speed digital electronics (e.g. 0.35 micron CMOS). Referring now to FIGS. 3(*a*) and 3(*b*), it is possible—using the formulae for transmission and reflection in a Fabry Perot etalon (equation 2 gives the transmission) in conjunction with the equation for the separation between micro-mirror and substrate over time—to determine the transmission through the micro-mirror versus time when the spacing of the etalon mirrors follows the time dependence as shown in FIGS. 3(*a*) and 3(*b*). FIG. 3(*a*) shows experimental transmission data for normal incidence whilst FIG. 3(*b*) shows the corresponding data for a 60 degree angle of incidence. Once again the horizontal axis denotes time whilst the vertical axis denotes optical transmission through the micro-mirror.

In the first example shown, for light incident normal to the plane of the etalon, two transmission peaks occur as the micro-mirror rises away from the substrate and a corresponding two peaks as it is drawn back towards the substrate. The second example shows that at 60 degrees there is one transmission peak as the micro-mirror moves to maximum displacement and a second as it returns to the pull down position. However the timing and number of peaks varies with angle of incidence of the light beam so that it is highly desirable to know the angle of incidence in order to optimise etalon timing. Each graph shows the transmission characteristics at two temperatures (of approximately 20 degrees and 70 degrees) showing a good degree of consistency between those two operating values.

Alternatively, measurements of the oscillation pattern may be used to determine the angle of incidence of light on the modulator.(In practice one derives a measurement of $\cos(\theta)$, where $\theta$ is the angle of incidence)

Figure 9A:
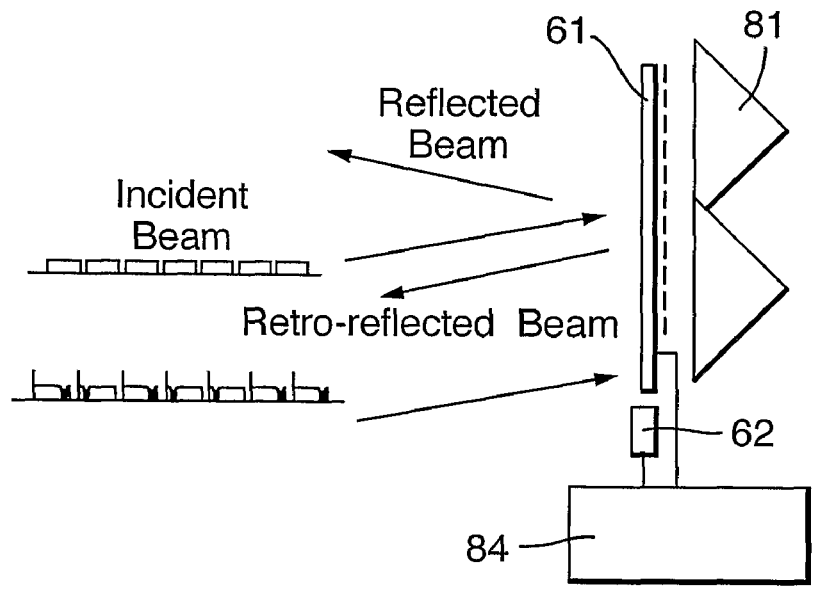
FIG. 9(a) shows a schematic diagram of a fourth modulator arrangement in accordance with the present invention incorporating a retro-reflector.
Figure 9B:
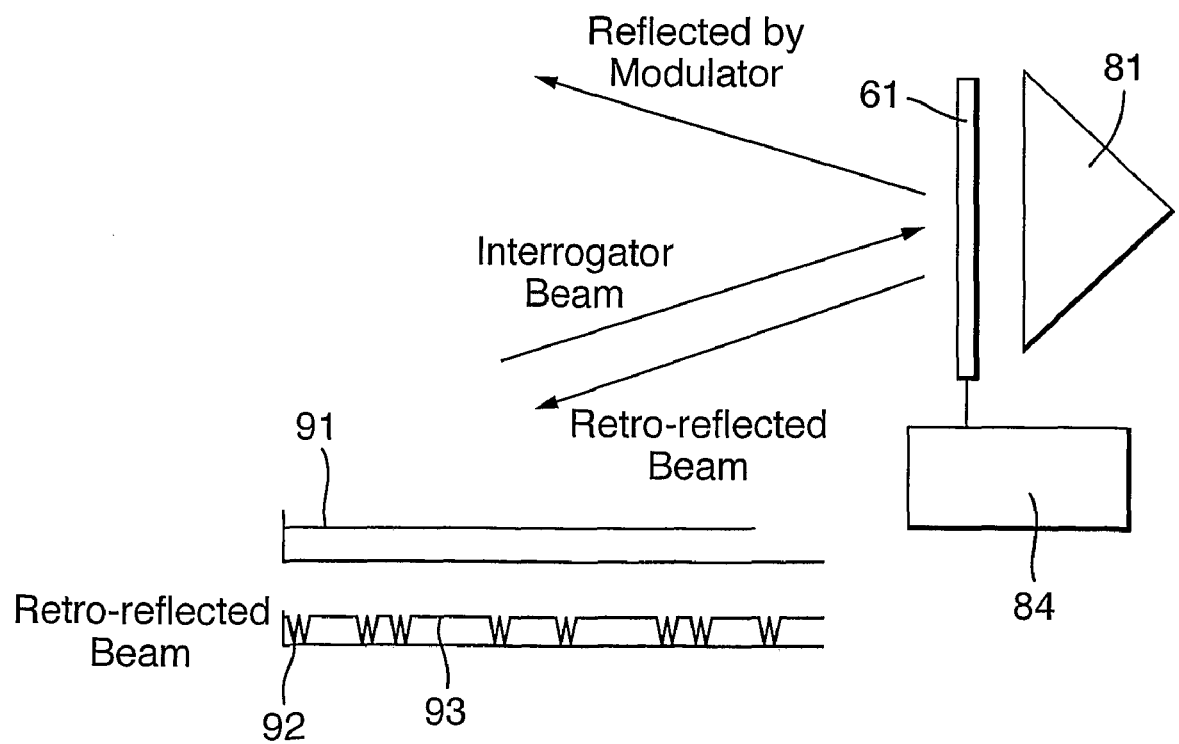
FIG. 9(b) shows a schematic diagram of a fourth modulator arrangement in accordance with the present invention incorporating a retro-reflector.
Figure 9C:
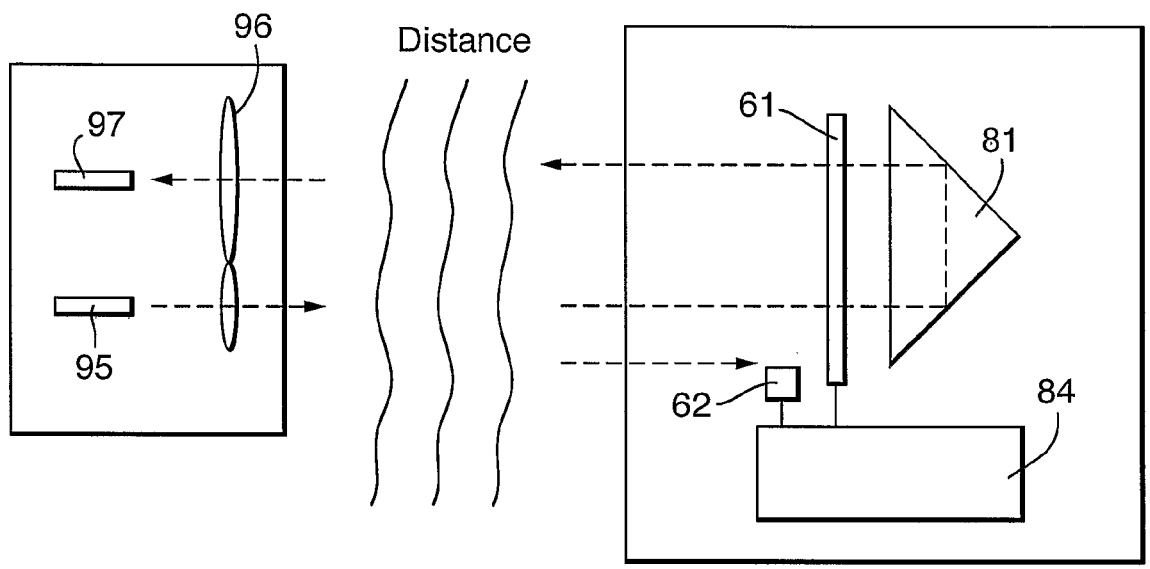
FIG. 9(c) shows a schematic diagram of a system in accordance with the present invention;.

This device may be used to control a continuous wave (cw) laser (or a laser with a predictable pulse pattern) providing that the detector system can resolve the dynamic modulation produced by the modulator.(FIG. 9(*b*) and 9(*c*)). Alternatively it may be used to control a repetitively pulsed laser (FIG. 9(*a*)) providing that the pulse duration is substantially shorter than the oscillation period of the micro-mirror. In this case the detector in the interrogator system (new FIG. 10 or 9*c*) does not need to be able to resolve the dynamic behaviour of the modulator but only has to resolve the individual pulses of the interrogator. A timing circuit may be used, which may consist of a detector detecting arrival times of incident pulses, the timing of which is used to predict the precise arrival time of a subsequent pulse. The micro-mirror is held in the pull-down position and then may be released at a time calculated such that the micro-mirror system will be in a position to apply the desired amount of modulation to the pulse at the time the laser pulse is predicted to arrive.

Figure 4:
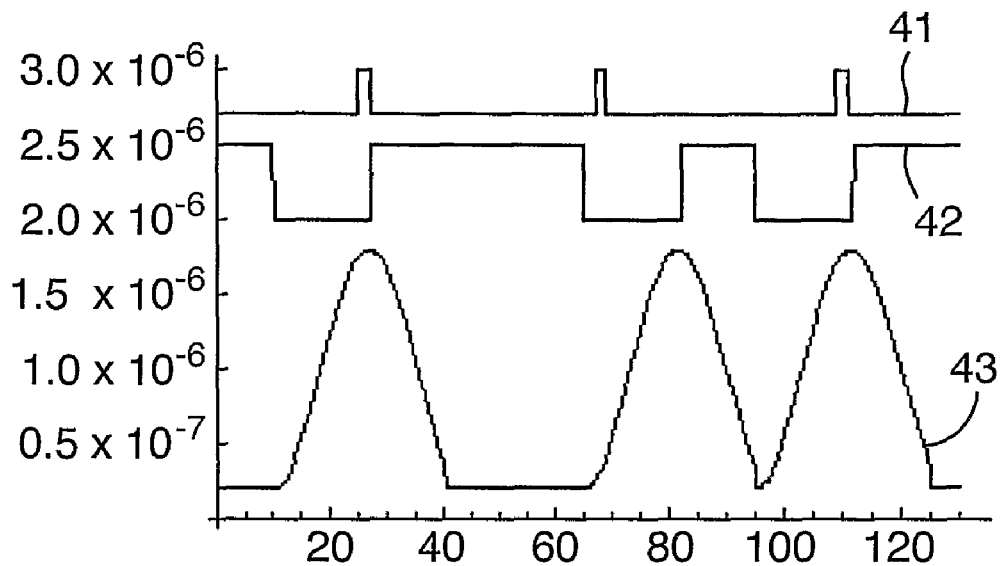
FIG. 4 shows a schematic graph of dynamic response over time of a modulator in accordance with the present invention.

Referring now to FIG. 4 the dynamic response of the etalon is shown versus time (clock pulses). The top trace 41 represents incoming laser pulses (arbitrary units); the middle trace 42 shows voltage applied to micro-mirror (pull-down voltage corresponds to "$2.5 \times 10^{-6}$", 0V corresponds to "$2 \times 10^{-6}$"), the bottom trace 43 shows spacing between substrate and MEOMS mirror (scale in meters).

If a laser pulse arrives near maximum displacement (first and third pulses) then transmission is maximum and logic 1 transmitted. If a laser pulse arrives when the mirror is close to the substrate (second pulse) then transmission is minimum and logic zero is transmitted.

Figure 5:
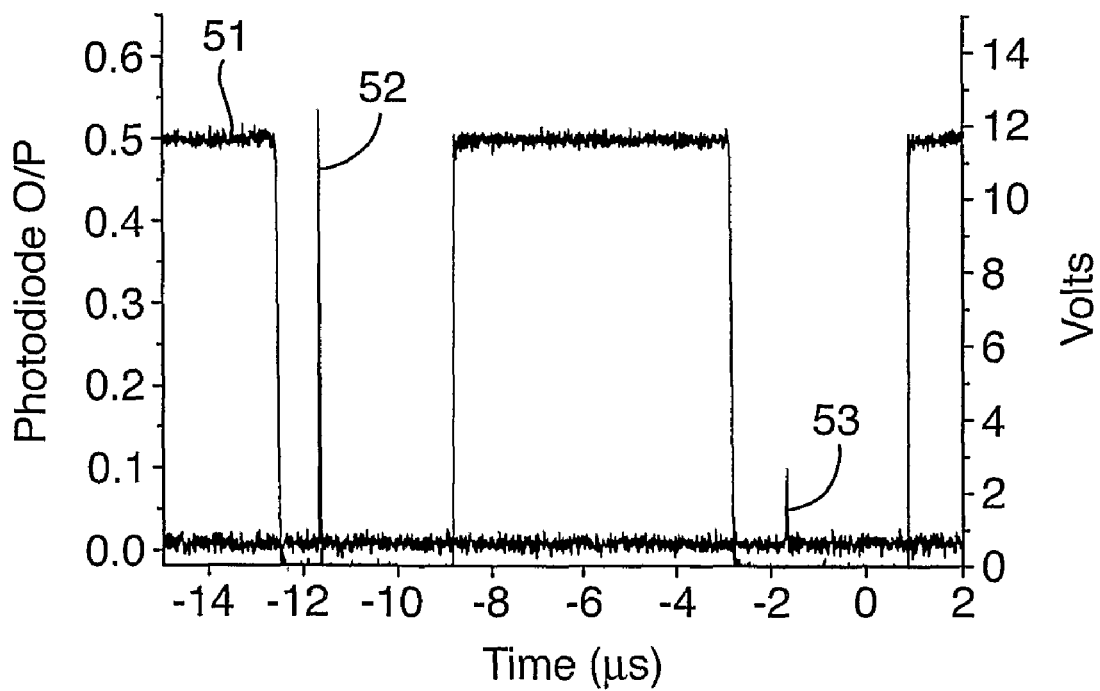
FIG. 5 shows a schematic graph comparing applied voltage with transmitted signal in accordance with the present invention.

Referring now to FIG. 5, experimental data is illustrated for the case in which trace 51 shows the micro-mirror drive voltage, and 52-53 show the transmitted power of two laser pulses. The delay between the release of the micro-mirror and the arrival of the first pulse is such that the transmission is high 52. The delay between the release of the micro-mirror and the arrival of the second pulse is such that the transmission is low 52.

The modulator may be used with a retro-reflector, a detector and drive electronics to form a transponder that can communicate with a remote interrogator system as illustrated in FIG. 9(c). On the right the transponder is illustrated, while on the left, there is shown a laser 95 with a collimating lens 98, and a detector 97 with a collecting lens 96. If the transponder is sufficiently far away that light from the transponder diffracts and spreads so that it does not just return to the laser interrogator, but also spills over and passes into the receiver optics, then the detector will detect whatever light is reflected back from the transponder. In this case the interrogator will detect the modulation produced by the remote transponder.

The modulation imposed on the received pulses may be amplitude modulation, or phase modulation, or both together.

In a truly cw interrogator, the transponder may not need a detector and may simply transmit a modulating pattern for any interrogator to detect. It may alternatively use a detector to detect the presence of interrogator light. In a quasi-cw modulated interrogator, the transponder detector may use the timing information in the interrogator beam (e.g. intensity spikes or breaks in intensity) to synchronise the modulation with respect to the timing information. In the case of an interrogator producing a series of short pulses, then the transponder may detect the arrival of one pulse and use this timing information to determine the optimum timing to produce modulation of the next pulse. The optimum release time may be determined by, for example, detecting arrival of one pulse and collecting information on the angle of arrival, and then using a look-up table to determine the optimum delay. As an example, the system could be used to switch the transmission or reflection of the pulse between a maximum and a minimum value, or it may be used to control the amplitude of pulses so that they are all of the same intensity or so that they are coded in some way. One can do this in the first half cycle of the oscillation. One may alternatively do this at any predictable point during the mechanical oscillation, or one may even allow the micro-mirror to make two oscillations and achieve modulation of a pulse in the second oscillation (which is significant if one wishes to achieve full duplex communication).

Figure 6:
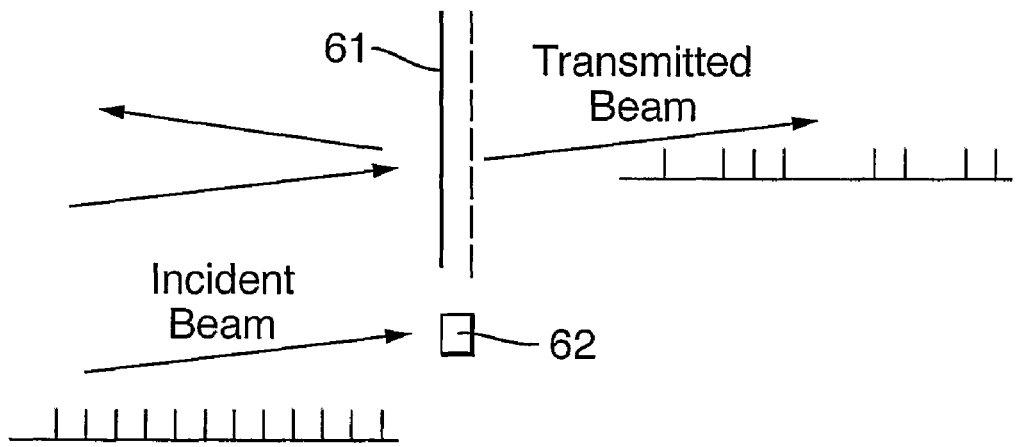
FIG. 6 shows a schematic diagram of a first modulator arrangement in accordance with the present invention.

Referring now to FIG. 6, the modulator 61 may therefore have a detector 62 associated with it so that it can detect the arrival of one pulse and use this information to release the micro-mirror in order to modulate the subsequent pulse.

Figure 7:
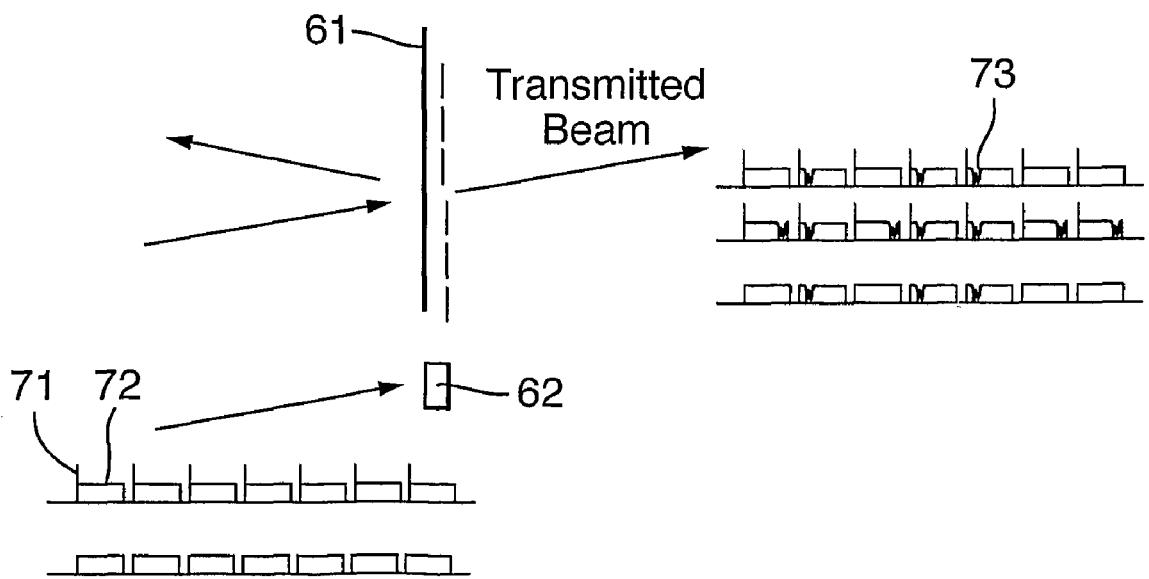
FIG. 7 shows a schematic diagram of a second modulator arrangement in accordance with the present invention.

Referring now to FIG. 7, in a variation of the above scheme the remote laser illuminator may consist of a repetitively short-pulsed laser system combined with a long pulse or continuous wave laser system. In this arrangement the short pulse may be used as a timing pulse. The modulator may use the short pulse for timing, and then impart a modulation on the continuous wave or long pulse part of the illumination. The modulated beam may then be encoded by, for example, a time shift of the modulation relative to the timing pulse. If the interrogator has a sufficiently fast detector or sensitive detector then it may not be necessary to have any timing information on the interrogator beam and no detector on the transponder. The interrogator detector may either detect the time resolved modulation, or may detect the small fast change ion the average retro-reflected power.

FIG. 7 schematically shows interrogation of a modulator 61 with a laser pulse comprising a timing pulse 71 and a quasi-cw laser pulse 72. The quasi-cw part is modulated 73; one can either code the beam by modulating or not modulating each pulse; or else one can choose to modulate or apply a time-delayed modulation. One can either use an initial timing pulse or one can use the rising edge of a rectangular-wave interrogation pulse (see examples lower left). Examples of the modulated pulses are shown middle right.

Figure 8:
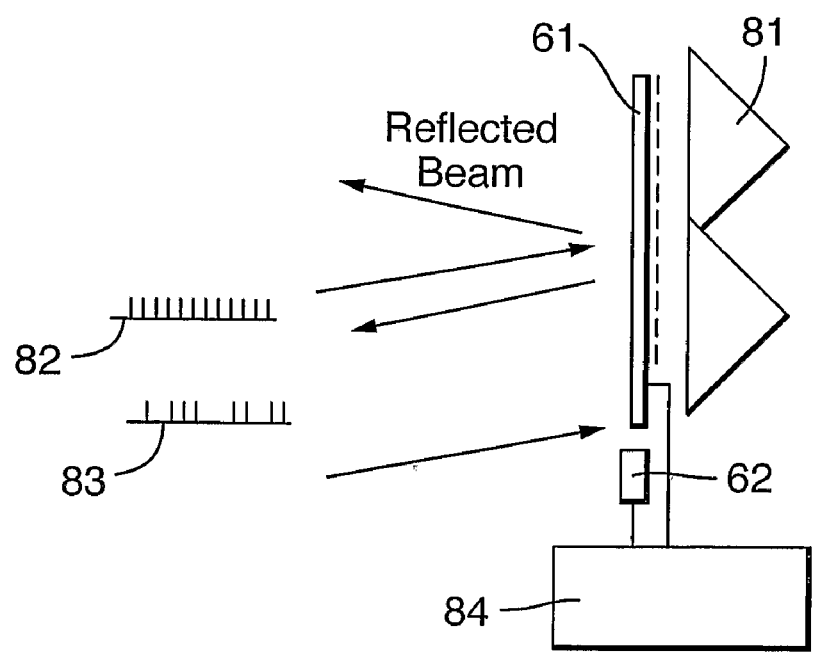
FIG. 8 shows a schematic diagram of a third modulator arrangement in accordance with the present invention incorporating of a retro-reflector.

Referring now to FIG. 8, the modulator 61 may be combined with a retro-reflector 81 and thereby act as a modulated retro-reflector. Whilst the modulator micro-mirror elements may, by way of example, be of the order of 25 µm across the elements of the retro-reflector may be considerably larger, for example 5-15 mm across. Providing the individual micro-mirrors move coherently, the divergence of light passing through the modulator will be determined by the overall array size and not by the divergence due to diffraction by a single micro-mirror. The use of relatively large retro-reflecting elements assists in forming a strongly collimated beam of reflected light. The modulated retro-reflector device may then be illuminated by a laser interrogator transmitting a pattern of pulses 82. The modulated retro-reflector device will then modulate the incoming pulses and retro-reflect the pulses 83 back to the interrogator. In this the interrogator pulses are essentially pulsed and the retro-reflected light is either wholly retro-reflected or wholly attenuated. The interrogator may then receive the retro-reflected pulses and decode them as a series of '1's and '0's. This modulator arrangement may use a detector 62 to detect pulses, and use a control unit 84 to predict the arrival time of subsequent pulses, using the detection of one pulse to determine the time to release a micro-mirror in order to modulate a subsequent pulse. In this case the angle of arrival on the retro-reflector will have to be controlled; alternatively the retro-reflecting system may use some form of angle detection to determine the optimum timing for the micro-mirror release.

Alternatively the combined system of interrogator and retro-reflecting modulator system may optimise performance. The modulator may be operated at a fixed time delay and the interrogator may determine the angle of arrival and vary the timing of pulses so that optimum modulation occurs.

The optimum timing for the modulator to produce a maximum or minimum signal will be angle dependent. If the above system is to work for light incident at any angle then the detector should preferably incorporate a means of determining the angle of arrival since optimum mirror timing depends upon angle of incidence of the incident light. Alternatively the interrogator may incorporate a means of estimating the angle of incidence on the tag and change the timing of pulses on the tag to ensure maximum modulation.

Referring now to FIGS. 9(a) and 9(b), alternatively one may use a modulated retro-reflector device together with an interrogator which may (or may not) transmit a set of short timing pulses together with quasi-continuous lower-intensity pulses. The modulating retro-reflector device may then modulate the quasi-continuous lower intensity pulse at some controlled time after the timing pulse. The device will retro-reflect this power back to the interrogator. In this arrangement the interrogator pulses comprise a modulation with a quasi CW period, and the retro-reflected light is synchronised with the pulsed element of the interrogator but the modulation is applied to the quasi-cw region of the interrogator illumination.

The precise modulation pattern received by the interrogator will depend on the angle of arrival on the retro-reflecting device, but the interrogator may be able to recognise the particular pattern and from this it will be able to determine the optimum time delay relative to timing pulse, and if desired, the angle of incidence.

By measuring the quasi-continuous waveform and its timing relative to the timing pulses, the interrogator will be able to determine the size of the time shift applied to the waveform, and hence interpret this as a piece of data. An advantage of this latter approach is that the modulator arrangement does not need to have an angle detector integrated into it, allowing it to be more compact and to be manufactured more cheaply.

Referring now to FIG. 9(b) the interrogator may produce a continuous illumination 91 and the retro-reflected light may then be modulated 92, 93 without synchronisation linked to the interrogator.

Referring now to FIG. 9(c) an overall system comprises a one or more modulator arrangements as described above together with an interrogator laser system, which incorporates a transmitter 95 and a receiver telescope 96 coupled to a detector 97.

In a first angle measurement mode, the interrogator transmits a continuous wave beam, and measures the retro-reflected light from the transponder. The transponder operates in a 'release and catch' mode, possibly without the use of any cue from the interrogator. For each 'release & catch' cycle, the retro-reflection detector will detect a signal qualitatively similar to that shown in FIG. 3, i.e. comprising a series of relatively well defined maxima and minima. By measuring over several pulses and integrating the detector will be able to accumulate a well-resolved curve. The timing of the peaks of these curves is a function of the cosine of the angle of incidence on the transponder, as is the depth or height of the central peak or trough, and by suitable fitting and processing of the data, it will be possible to determine the cosine of the angle of incidence on the modulator.

In a second embodiment of the angle measurement mode, the interrogator transmits a series of pulses and measures the retro-reflected light from the transponder. The transponder operates in a 'release and catch' mode, initiating the release time a fixed time delay after detecting a pulse from the interrogator. For each 'release & catch' cycle, the retro-reflection detector will detect a pulse from the transponder and it may record the amplitude of each pulse. If the interrogator slowly varies the timing between pulses so that the time delay between pulse N and pulse N+1 equals the time delay between pulse N−1 and pulse N plus some increment Dt, then each pulse will be modulated by a different part of the response curve of the modulator, and over a period of several pulses the interrogator will stroboscopically sample the whole transmission profile of the modulator. This data will enable the interrogator to infer the angle of incidence on the transponder.

In a first communication mode, the interrogator uses a train of pulses to interrogate the modulator arrangement. The modulator arrangement detects the timing of the incoming signal and the angle from an angle detector. From the time-history of the past set of pulses, the modulator arrangement is able to predict the arrival time of the next pulse. Using an internal clock and a look-up table it releases the micro-mirror array at such a time that the modulator provides a maximum or minimum transmission of the next pulse when it arrives. Alternatively, minimum transmission may be obtained by simply holding the micro-mirrors in the pull-down position. The receiver detects pulses which it determines to be either logic 1 or logic 0. This mode will give performance over a maximum range.

In a second communication mode, the interrogator may (or may not) send a series of timing pulses (or a series of square pulses with sharp edges that can be used for timing purposes). This may be superimposed on a quasi continuous interrogation power. The modulator arrangement detects the timing of timing pulses, but does not attempt to determine the angle of arrival. It operates the 'release & catch' mechanism in one of two ways: it either modulates the pulse to indicate a logic one, and does not modulate to indicate a logic zero (or vice versa), or else it modulates at one of two preset time delays to indicate either logic one or logic zero. The advantage of the former is that a low bandwidth detector can detect modest changes in transmission which indicate whether or not modulation has been applied. The advantage of the latter technique is that it positively indicates detection of logic one and logic zero.

Alternatively, for true cw interrogation 91, one can detect either the presence 92 or absence 93 of modulation, or the presence of time-key shifted modulation, providing the interrogator can detect the modest change in signal strength that is expected if the signal integration time is slow compared with the high frequency components in the modulation signal.

The interrogator receives the timing pulse and the analogue return. Irrespective of the angle of arrival it is able to recognise the timing of the analogue return by reference to the retro-reflected timing pulse.

In a remote angle detection mode the goal is to determine the angle of incidence on a remote modulator arrangement. This may be useful for determining, for example, in which direction an interrogator should move in order to maximise the signal from the modulator arrangement, or to determine the orientation of the modulator. The interrogator illuminates the modulator with a quasi cw beam and detects the time resolved retro-reflection when the micro-mirrors are released and caught. By matching the detected signal to a template, the processor can identify the template corresponding to a particular angle of incidence.

In an intensity stabilisation mode, the goal is to stabilise the average of an output beam when the input beam is fluctuating on a timescale which is slow compared with the repetition rate (for example owing to scintillation). The incident power is incident on a modulator which is synchronised to provide a particular degree of attenuation. When there are fluctuations in the incident power, small timing changes can be made to the release time of the micro-mirrors so that the attenuation is adjusted, thereby ensuring that the overall laser power is maintained at a constant value. If the incoming beam is, for example, a string of logic 1 and logic 0 pulses, with a more slowly varying intensity fluctuation caused by scintillation, then the system could be modulated so that the slowly varying fluctuation was removed by the stabilisation, but the more rapid variation between logic 1 and logic 0 remained and could be detected later. This approach may be used in place of a detector with a large dynamic range in order to detect the signal in a free-space optical laser communications system.

In a spatial light modulator mode, then groups of micro-mirrors on an array are released so as to produce a spatial pattern across the beam. This may be used for various applications where other spatial light modulators are currently used, including for example signal processing and beam steering.

In a beam steering mode, if one controls the release time of each individual element then one can effectively control the phase on each element of the micro-mirror array. By controlling the phase of each element, the propagation direction can be controlled. Thus this may be used to steer a laser beam in a predetermined direction, provided each micro-mirror can be individually controlled.

Considering the characteristics of the Fabry-Perot etalon in more detail, the transmission of the MOEMS mirror-substrate modulator may be modelled by considering the system as a simple structure with two reflecting surfaces, the reflection coefficient being determined by the Fresnel reflection equations applied to silicon. The transmission of a Fabry Perot etalon is given by:

$$T_{etalon} = \frac{T^2}{(1-R)^2} \frac{1}{1 + \frac{4R}{(1-R)^2}\sin^2\left(\frac{\phi}{2}\right)}; \quad (2)$$

$$\text{where } \phi = \frac{4\pi}{\lambda}L\cos\theta$$

in which the spacing between the plates is given by L, the angle of incidence is given by $\theta$ and the wavelength is $\lambda$. The reflectivity of each surface is given by R and the transmission is given by T.

If we consider the combination of the modulator and a corner cube retro-reflector, then we note that the reflected light will be determined by the combination of the two polarisation components. We consider the case where the interrogator is circularly polarised or depolarised, so that there are equal intensities of the two polarisations, whatever the angle of arrival. The incident light will have equal amounts of 's' (E vector parallel to surface) and 'p' polarised light (E vector in plane of transmitted and reflected beams). Each polarisation is transmitted by different amounts, and the part polarised beam enters the corner cube retro-reflector. This will become depolarised by a variable amount, depending on the nature of the retro-reflector. If the corner cube retro-reflector is metal coated then the polarisation properties will be preserved. If it relies on dielectric materials it will be significantly depolarised for certain angles. In the latter case it is assumed as an approximation that the beam is fully depolarised by the corner cube. The depolarised beam makes a second pass back through the etalon and returns to its source.

Thus the modulated retro-reflection is taken to be $$C_{retro} = \frac{(T_s + T_p)^2}{4} R_{cc} \quad (3)$$

where $C_{retro}$ is the component of the retro-reflection, $T_s$ and $T_p$ are the transmission for the s and p polarisations respectively and $R_{cc}$ is the reflectivity of the corner cube.

It is noted in passing that the phase $\psi$ of the transmitted light is given by the relation:

$$\psi = \text{Arg}\left\{\frac{1}{1 - R\exp(i\phi)}\right\}; \quad (4)$$

$$\text{where } \phi = \frac{4\pi}{\lambda}L\cos\theta$$

Figure 10:
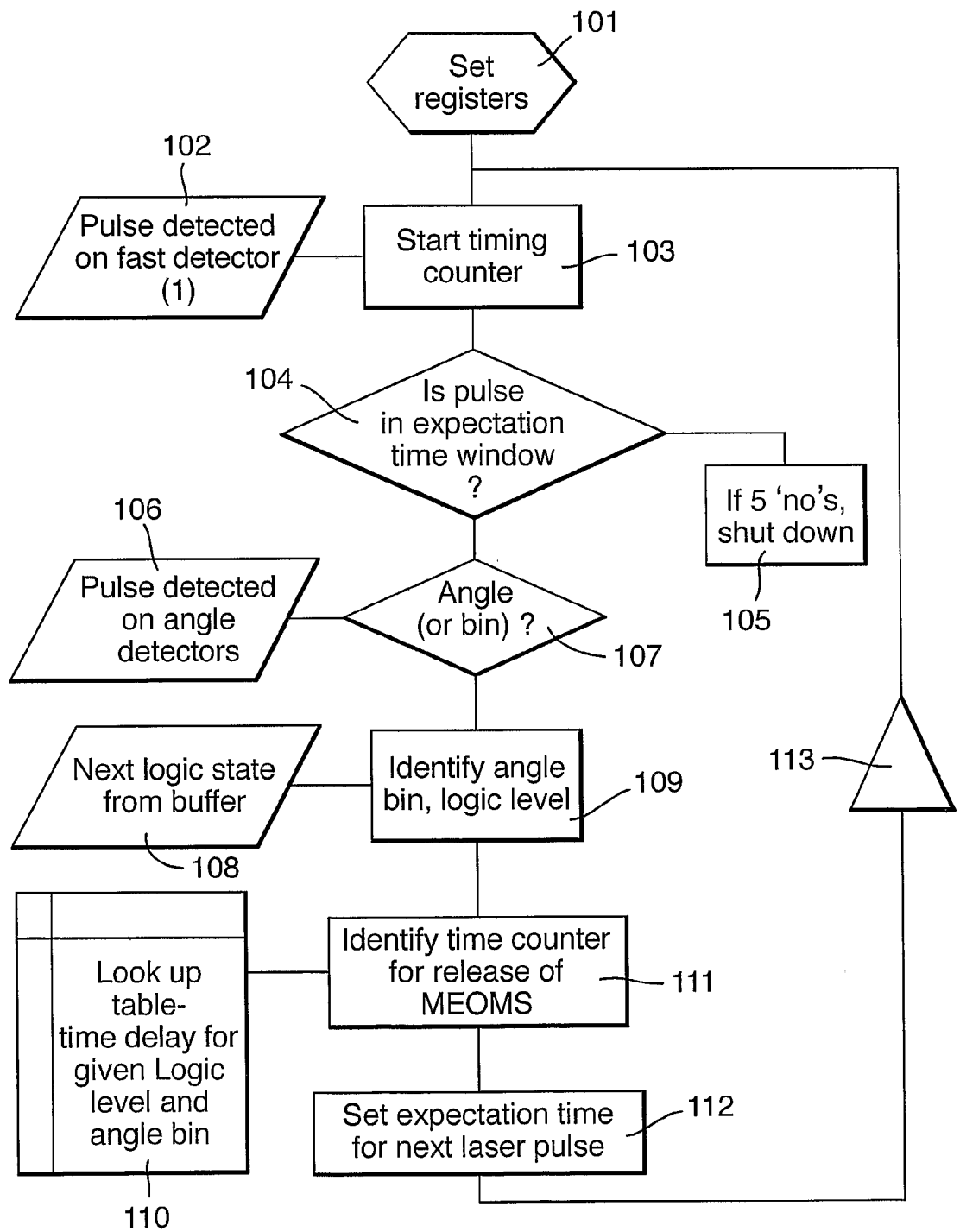
FIG. 10 shows a flow chart of a modulation method in accordance with the present invention.

Referring now to FIG. 10, there is shown a logic diagram for control of a modulator micro-mirror. Local registers are initialised 101 and when a timing pulse is detected 102 the timing counter is started 103. If the pulse arrives in the expectation time window 104 then the angle or angle range (or angle range or "bin") is determined 106-109. A release time for the micro-mirror 111 and expected arrival time for the next pulse 112 are then determined responsive to the established angle of incidence. This may conveniently make use of a look-up table 110. The process is then repeated 113 for the new expectation window. If the modulator repeatedly fails to receive pulses in the expectation window then it may terminate 105 or take other appropriate action.

Figure 11:
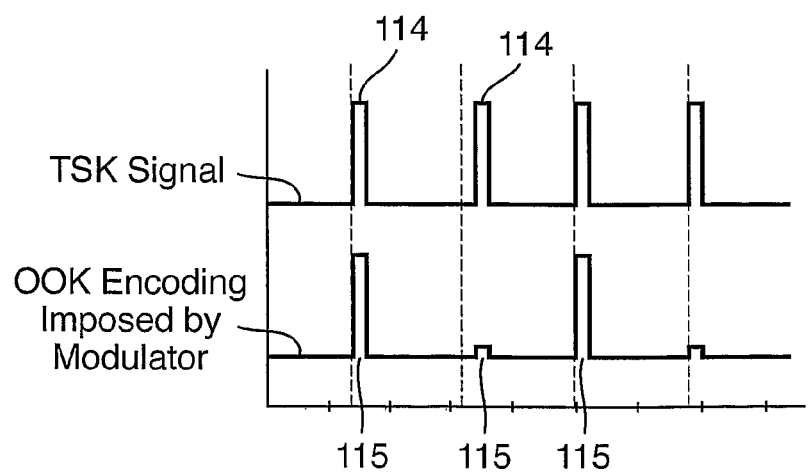
FIG. 11 shows a schematic graph of received time-shift keying encoded pulses and transmitted modulated on-off keying pulses in accordance with the present invention.

Referring now to FIG. 11, in a further enhancement of the system described above a method is proposed for supporting two-way (duplex) communication: that is, the capability to transfer data from the interrogator to the modulator arrangement at the same time as from the modulator arrangement to the interrogator. The method employs a technique known as time-shift keying (TSK), where variations in the time between successive pulses are used to encode data.

In the systems described above, the interrogator laser sends out a series of pulses which are spaced regularly in time. In one embodiment the pulses are 7 ns long and are emitted at a repetition rate of 200 kHz (1 pulse every 5 microseconds). The modulator arrangement comprises a photo-detector which registers the arrival of each pulse.

The modulator arrangement knows the length the time between the pulses and uses this information to set the MEOMS modulators to give the correct transmission at the time each pulse arrives: high transmission for a one and low transmission for a zero. The reflected pulses are received by a photo-detector located at the interrogator. The modulator uses On Off Keying (OOK) to communicate with the interrogator: that is, the signal received by the interrogator contains a string of uniformly spaced pulses which is binary coded in terms of pulse peak height. The transmission of the modulator varies in a timescale of typically 100 ns or more.

The present inventors have noted however that it is possible to use the pulse arrival-time measurement at the modulator arrangement as a means of transferring data from the interrogator to the modulator arrangement. Information may be sent by the use of time-shift keying (TSK) which involves varying the length of time between pulses 114.

In a first embodiment the changes in the inter-pulse interval are made sufficiently small such that each pulse still arrives in the correct "time window" of modulator operation, so that it still sees the correct high transmissivity for a one or low transmissivity for a zero. This would require that the time shift in the downlink signal (from interrogator to the modulator arrangement) be less than 100 ns. The modulator modulates the signal using OOK to generate a string 115 of on-off pulses having a pulse timing characteristic dependent upon the time-shift keying imposed upon the signal received from the interrogator. In this way data transfer can take place in both directions simultaneously.

Figure 12A:
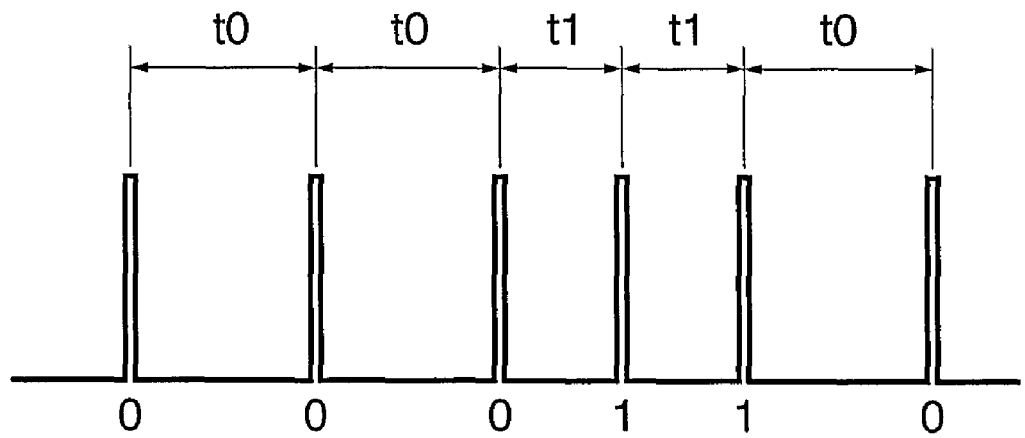
FIG. 12(a) shows a schematic diagram of a first example of interrogator pulse timings in accordance with the present invention.
Figure 12B:
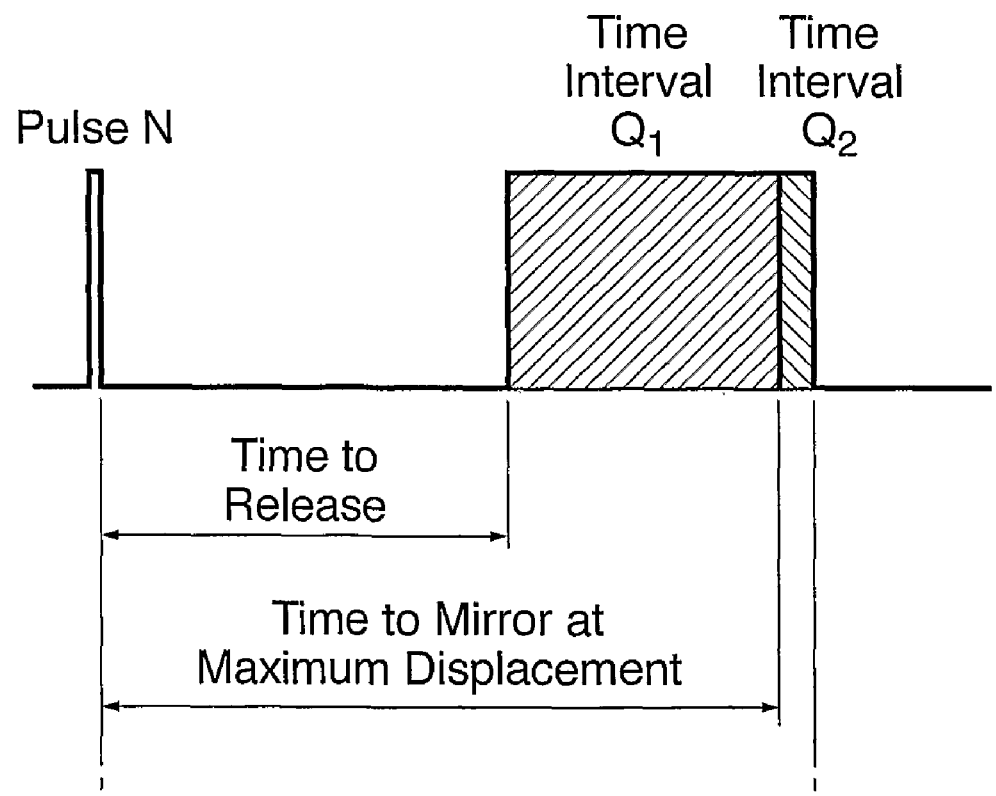
FIG. 12(b) shows a schematic diagram of a second example of interrogator pulse timings in accordance with the present invention.

In a second embodiment, and referring now to FIGS. 12(a) and 12(b), larger timing changes could be used, which would be more easily detected by the modulator arrangement. In this embodiment data transfer alternates between tag-to-interrogator and interrogator-to-tag. In this mode of operation, the interrogator sends out equally spaced "logic 1" pulses when it wants data from the tag and then changes the inter-pulse duration to signal the tag to stop transmitting and start receiving. When operated in this mode, the case of a "logic 0" interrogator pulse will cause the transponder to produce a modulation that depends on the angle of arrival at the transponder, and therefore this transponder pulse will be unsuitable as a source of data to the interrogator: it is impractical reliably to impress an OOK modulation onto the received pulse.

A simple approach provides for half-duplex communication; that is, only one-way communication takes place at one time. In this arrangement, the pulse from the interrogator is interpreted by the transponder as a logic 1 when it falls in the time interval Q1 and logic 0 when the pulse falls in time interval Q2. This will correspond to varying time intervals t0, t1 between pulses emitted by the interrogator. The time interval Q1 covers the period when the micro-mirror moves from the pull-down position to the position of maximum distance from the substrate, and the time interval covers a short interval after the micro-mirror has reached this position. The precise timing of the interrogator pulse within the interval Q1 is determined by a calibration mode, which will ensure that the retro-reflection from the transponder has optimum contrast to send data to the interrogator. When the pulse from the interrogator arrives within the time interval Q2, the retro-reflection coefficient depends primarily on the angle of incidence on the modulator, and so there is no useful information contained in the retro-reflection signal. Thus the interrogator can communicate data to the transponder but while it is doing so the ability to communicate data from the transponder to the interrogator will be degraded. When the interrogator has finished communicating, it transmits a string of 'logic 1 ' pulses and the tag is then able to modulate this and return it to the interrogator.

Figure 13:
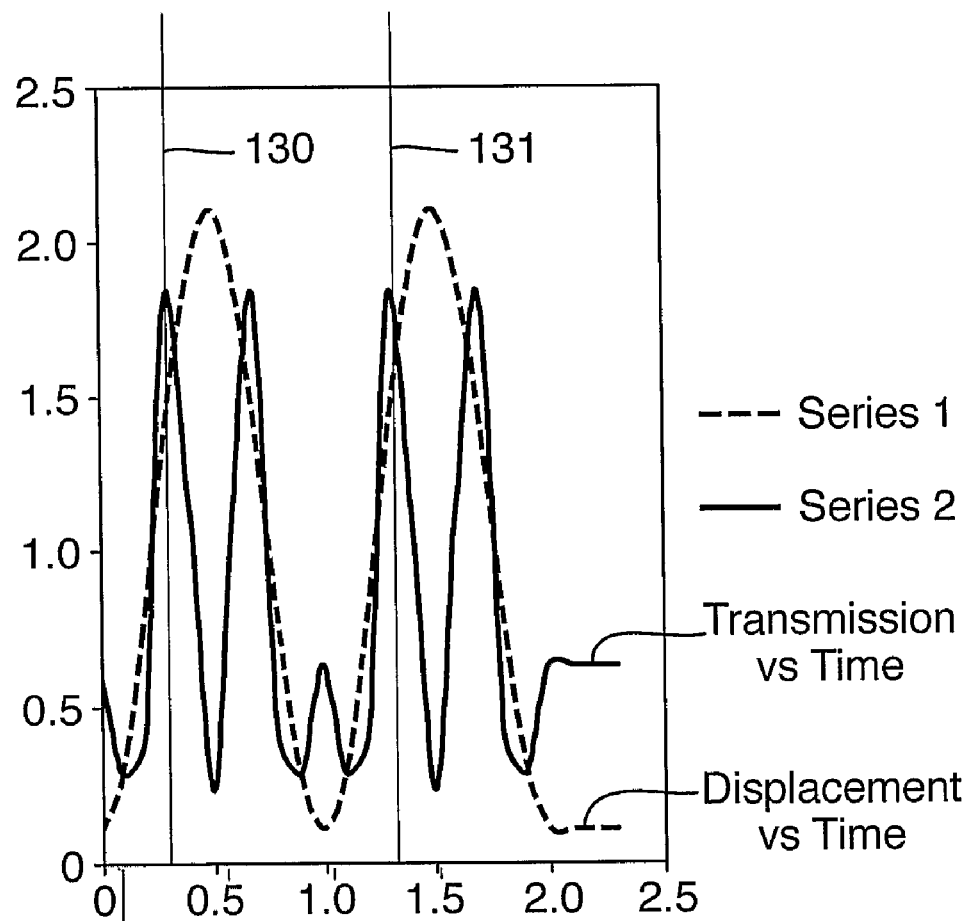
FIG. 13 shows a schematic diagram of a second example of communication in accordance with the present invention.
Figure 13:
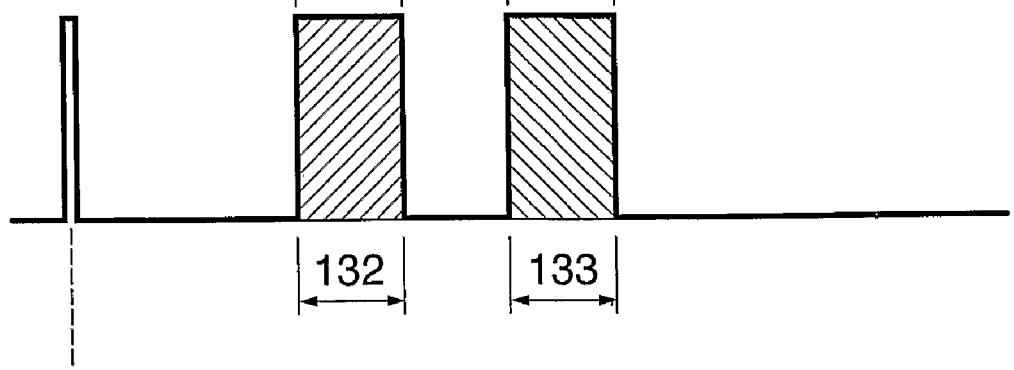

In a third embodiment, large time shifts are used, but in such a way that the communication from transponder to interrogator is not disrupted by the interrogator sending a 'logic 0" pulse. The interrogator will send out a logic "1" pulse in the usual way, but will indicate a logic "0" pulse by delaying by an amount exactly equal to the oscillation period of the micro-mirror in the transponder. The transponder will operate in the usual way whenever it detects a logic 1 pulse, but if it fails to detect a logic "1" pulse, then it will let the micro-mirrors produce a second oscillation before using the electronics system to 'capture the micro-mirrors in the hold down system. In this case, then whatever the modulation that would be produced on the interrogator pulse for logic 1 is replicated for the interrogator pulse with logic zero. The advantage of this is that the data stream from the transponder to the interrogator is not disrupted by the sending of data from the interrogator to the transponder, but the disadvantage is that the data rate is slowed down. Such a scheme is illustrated in FIG. 13, in which receipt of a Logic 1 from the interrogator results in the modulator modulating the received pulse during a first oscillation of the micro-mirror. Having detected the incoming Logic 1 pulse during the first oscillation, the transponder would then hold down the micro-mirror after only one oscillation.

If no Logic 1 is received 130 during a predetermined time interval 132 during the first oscillation, the micro-mirror is allowed to continue into a second oscillation during which it may receive an incoming Logic 0. If a logic 0 is received 131 during a predetermined time interval 133 during the second oscillation then it will be modulated and the micro-mirror pulled down only upon completion of the second oscillation. FIG. 13 shows two full oscillations as in the case in which no Logic 1 were received.

Figure 14:
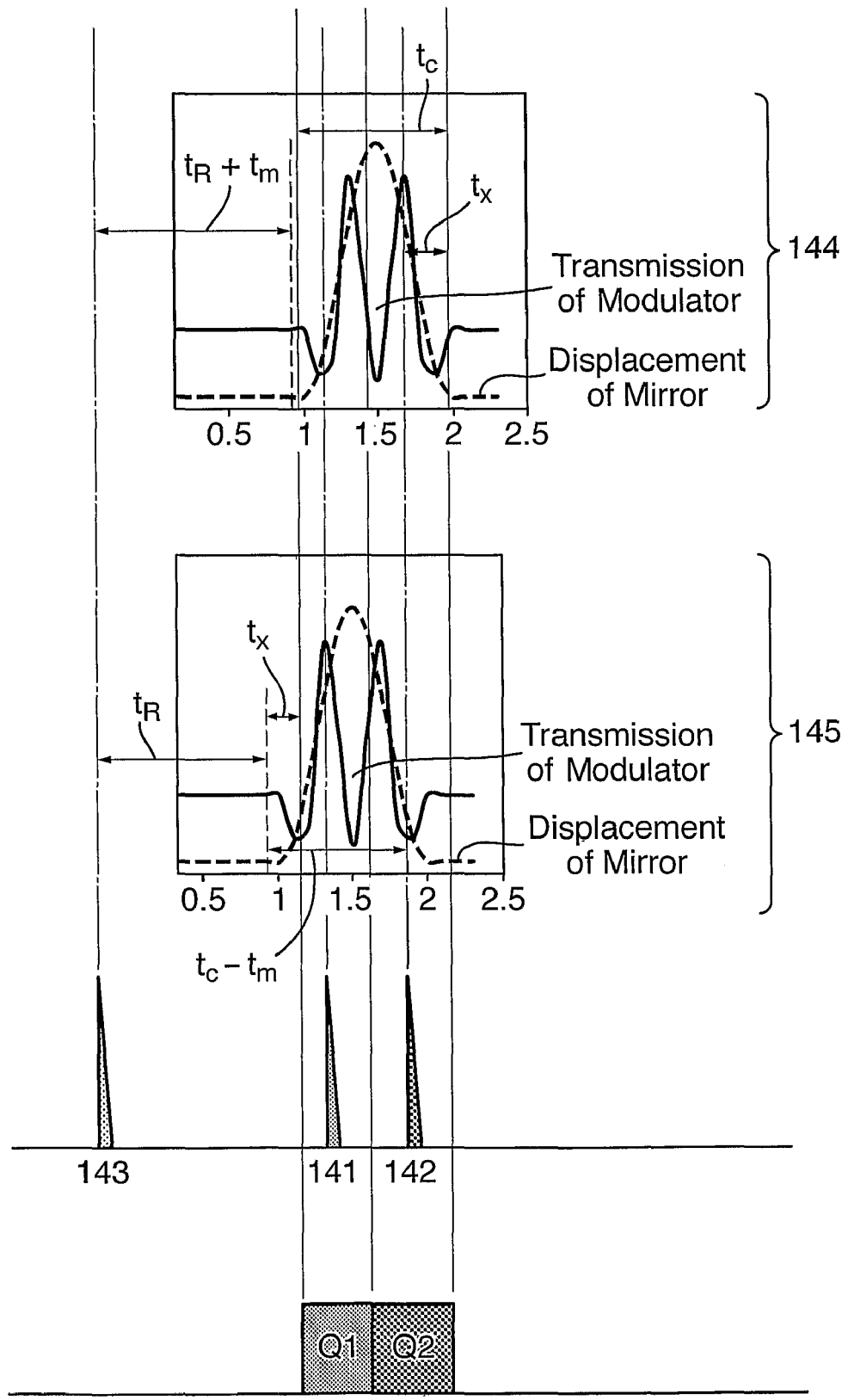
FIG. 14 shows a schematic diagram of a third example of communication in accordance with the present invention.

FIG. 14, illustrates a method whereby it is possible to use the two halves of a single micro-mirror oscillation cycle such that the first half Q1 is interrogated by an interrogator logic 1 pulse, and the second half Q2 by an interrogator logic 0 pulse.

In one such communication embodiment, the interrogator initiates a 'time calibration mode' to determine information relating to the angle of incidence of the interrogation signal on the tag.

After it has acquired appropriate data, it changes to a 'communication mode' and uses the data gained in the time calibration mode to optimise the communication process. In the 'time calibration mode' it sends a series of timing pulses, with several different timings between adjacent pulses, similar to the angle measurement mode described above. The transponder detector detects the arrival time of timing pulses, but does not attempt to determine the angle of arrival. The transponder drive circuit initiates the release and catch process on the modulator after a fixed time delay and thereby modulates the subsequent pulse, which is retro-reflected back to the interrogator. The interrogator receiver measures the signal strength for each of the different time delays, and identifies which time interval provides the strongest signal. This interval corresponds to the timing such that a 'logic 1 signal from the transponder will have a maximum signal strength, and the interrogator uses this timing between pulses in the subsequent communication mode. Note that the consequence of this is that the pulse repetition rate in the communication mode varies according to the angle of incidence varies on the transponder modulator.

In the communication mode, the transponder operates the 'release & catch' mechanism in one of two ways: in the first way it initiates the release & catch process after a fixed time delay and thereby modulates the pulse to indicate a logic one, and does not modulate to indicate a logic zero (or vice versa). In the second way, it modulates at the standard time delay to indicate logic '1' and a different time delay to indicate logic '0'. The tag is able to measure the separation of the pulses coming from the interrogator, and from this it is able to deduce information on the angle of incidence on the tag. It is therefore able to compute the optimum time delay such that the modulator produces a minimum signal strength for logic zero. The advantage of the former is that it is simplest to implement. The advantage of the latter technique is that it gives maximum contrast between logic one and logic zero for the maximum range of angles.

In a third communication embodiment, the interrogator performs in the same way as described in the second communication embodiment, but in addition the interrogator laser uses time shift keying to send messages to the transponder, while at the same time receiving messages from the transponder by on-off keying.

If we consider the case when the time shift required for unambiguous discrimination is more than 200 nanosecond, then there are at least three ways in which the interrogator and transponder can engage in two way communication by means of the interrogator using time shift keying to send a message to the transponder and the transponder using time shift keying to send messages to the interrogator.

Referring still to FIG. 14 we consider key times in the modulation cycle. The micro-mirror is released at time $t_R$, and the first maximum transmission occurs at a time $t_X$ after the release time. The micro-mirror has an oscillation period $t_C$, and the second maximum occurs when the micro-mirror is returning to hold-down. By symmetry, this occurs at a time $t_C-t_X$ after the release time. The oscillator period $t_C$ is a fixed parameter for the micro-mirror, and the transmission time $t_X$ depends on angle and will have been determined by the calibration mode of operation before communication mode starts.

The modulator has a transmission minimum that occurs at a time $t_m$ before the transmission maximum. By symmetry there is a second transmission minimum that occurs at a time $t_C-t_X+t_m$ after the micro-mirror release time. The time $t_m$ also depends only on angle, and if the time $t_X$ is determined from the calibration mode then it is possible to determine the value $t_m$ by using for example a look-up table. The transponder will have a look up table such that for every different value of $t_X$ there is a known value of $t_m$.

Referring still to FIG. 14, we consider a transponder in which the modulator is released at time $t_R$ after the previous interrogator pulse to send logic 1 back to the interrogator, and released at time $t_R+t_m$ after the previous interrogator pulse to transmit logic 0. The interrogator is timed to send a pulse at time $t_R+t_X$ after the previous interrogator pulse if it is sending logic 1 to the transponder, and with a time $t_R+t_m+t_C-t_X$ after the previous interrogator pulse if it is sending logic 0 to the transponder.

If the transponder modulator is interrogated by a logic 1 interrogator pulse, then it will modulate the pulse at time $t_X$ after the micro-mirrors are released for logic 1 and will modulate the pulse at time $t_X-t_m$ relative to the release time for logic 0. This occurs during the first half of the mechanical oscillation in time interval Q1 and the interrogator pulse is interpreted as logic 1 by the transponder. The logic 1 signal to the interrogator is a maximum retro-reflection and the logic 0 signal is a minimum retro-reflection.

If the interrogator comprises a data bit with logic 0, it will be transmitted at a time $t_R+t_m+t_C-t_X$. If the modulator is transmitting a logic 1 pulse to the interrogator, the micro-mirrors will be released at time $t_R$, and the interrogator pulse will arrive at time $t_C+t_m-t_X$ relative to the release time. As discussed above, the modulator will send a minimal intensity retro-reflection to the interrogator detector. If the modulator is sending a logic 0, then the micro-mirrors will be released at time $t_R+t_m$ after the previous interrogator pulse, and the interrogator pulse will arrive at the modulator at a time $t_C-t_X$ after the micro-mirrors are released. According to the discussion above, the interrogator pulse will experience maximum transmission, and the logic 0 signal at the interrogator will have a maximum values.

Thus when the interrogator pulse is sending logic 1 to the transponder, the transponder sends back a signal that is maximum intensity signal for logic 1 and minimum intensity for logic 0. When the interrogator pulse is sending logic 0 to the transponder, the transponder sends back a signal that is minimum intensity signal for logic 1 and maximum intensity for logic 0. The interrogator detector will detect the time shift that distinguishes a logic 0 interrogator pulse from a logic 1 interrogator pulse, so it is straightforward to implement an algorithm that ensures the interrogator correctly interprets incoming signals as logic 1 or logic 0 when it is sending data to the transponder in full duplex mode.

We note that the timing above depends on $t_c$ $t_R$, $t_m$ and $t_X$. The parameters $t_C$ and $t_R$ are fixed by the transponder design, and $t_X$ is measured by some method prior to communication. In addition a method such as a look-up table will enable the user to use the value of $t_X$ measured in the set-up process to determine the value of $t_m$. Thus the interrogator and the transponder can deduce all the parameters and provide maximum performance of the communications link in full duplex mode.

Figure 15:
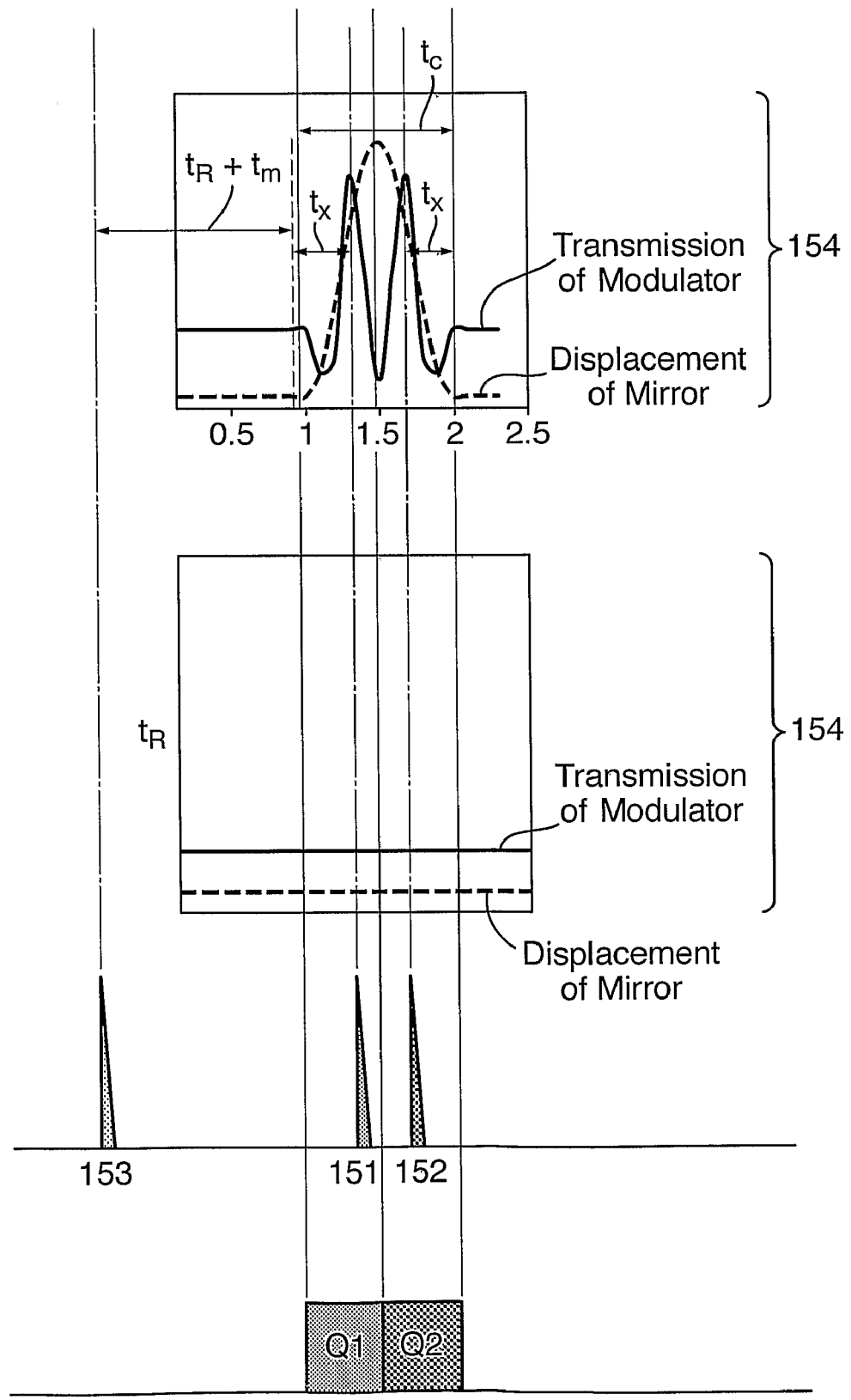
FIG. 15 shows a schematic diagram of a fourth example of communication in accordance with the present invention.

Referring now to FIG. 15, we consider the optimum timings when the transponder is configured to drive the modulator for logic 1 and leave the modulator held down for logic 0. The modulator is released at time $t_R$ after the previous interrogator pulse and if the interrogator pulse is encoded with logic 1 it will be timed to arrive at the transponder at time $t_R+t_X$ to give maximum transmission. If the interrogator pulse is encoded with logic 0, then the best time for transmission is at time $t_R+t_C-t_X$, which corresponds to the time when there is a maximum transmission as the micro-mirror returns to the pull-down position. In this case the logic state emitted by the transponder is unaffected by the logic state of the interrogator pulse, in contrast to the situation exemplified by the arrangement of FIG. 14.

The mode of operation of the interrogator should, of course, be matched to that of the transponder (that is that of FIG. 14 or that of FIG. 15) in order to ensure effective communication.

A laser used for such a system can be easily adapted to implement time-shift keying. A diode laser is driven by a short electrical pulse, which results in the emission of a short optical pulse. The pulse energy is increased by passage through an Erbium-doped fibre amplifier. The timing of the laser pulse may be changed by simply changing the timing of the electrical drive pulse.

One application of this approach is to provide a 'handshake' message to the modulator arrangement. The modulator arrangement may require a particular pattern or code of time shift pulses to determine that the interrogator is one which it is authorized to communicate with.

Another application is to allow the interrogator to control the flow of data from the modulator arrangement. If, for example, the modulator arrangement sends data in blocks, the interrogator can tell it when to start sending each block. Controlling the flow of data could be used to overcome errors caused by atmospheric-turbulence induced fluctuations of the laser intensity (scintillation): if error correction codes or a simple measure of the peak intensity indicates that data may have been lost, the interrogator could communicate with the modulator arrangement to ask it to re-send data. The interrogator may send a time-shifted pulse when the return signal falls below a certain level, and the modulator arrangement may immediately re-send the previous block of data.

Another application is to instruct the transponder to emit a particular pattern of pulses while the laser interrogator is optimizing the beam pointing system so that an acquisition system can more effectively collect light from the transponder A further application would be in the initial calibration of a modulator arrangement. An interrogator would illuminate the modulator arrangement and the modulator arrangement would carry out fine adjustments of its settings. The interrogator would be able to communicate with the modulator arrangement to tell it when optimum performance was achieved.

Any range or device value given herein may be extended or altered without losing the effect sought, as will be apparent to the skilled person for an understanding of the teachings herein.

The invention claimed is:

1. A method of providing duplex optical communication comprising receiving a time-shift keying encoded signal and selectively modulating received pulses so as to transmit an on-off signal wherein the step of selectively modulating comprises operating a MOEMS device having an oscillation period ($t_c$) and the differences in timing between logic 0 and logic 1 of the time-shift keying encoded signal are such that arrival time of each pulse within a single MOEMS device oscillation is chosen, responsive to angle of incidence of the time-shift keying encoded signal and to start time of the oscillation to correspond to high or low transmissivity through the MOEMS device independent of time-shift keying encoded signal pulse value.

2. A method according to claim 1 in which the modulator selectively reflects received pulses.

3. A method according to claim 1 in which the modulator selectively retro-reflects received pulses.

4. An optical signal modulator comprising a selectively transmissive element arranged, in operation, to selectively modulate successive pulses of an incident time-shift keying encoded signal whereby to provide an on-off encoded signal wherein the step of selectively modulating comprises operating a MOEMS device having an oscillation period ($t_c$) and the differences in timing between logic 0 and logic 1 of the time-shift keying encoded signal are such that arrival time of each pulse within a single MOEMS device oscillation is chosen, responsive to angle of incidence of the time-shift keying encoded signal and to start time of the oscillation to correspond to high or low transmissivity through the MOEMS device independent of time-shift keying encoded signal pulse value.

5. An optical modulator according to claim 4 further comprising a reflector arranged to reflect selectively modulated successive pulses.

6. An optical modulator according to claim 5 in which the reflector is a retro-reflector.

7. A method according to claim 1 wherein the MOEMS device comprises a micro-mirror having the oscillation period.

8. A method according to claim 1 wherein the MOEMS device comprises a Fabry-Perot etalon.

9. A method according to claim 1 wherein differences in timing between logic 0 and logic 1 pulses are equal to an oscillation period of a micro-mirror used in the step of selectively modulating.

10. A method according to claim 1 wherein the step of selectively modulating comprises oscillating a micro-mirror such that the first half (Q1) of single oscillations is interrogated by logic pulses representing a first logic value and the second half (Q2) of single oscillations is interrogated by logic pulses representing a second logic value.

11. A modulator according to claim 4 in which the modulator selectively reflects received pulses.

12. A modulator according to claim 4 in which the modulator selectively retro-reflects received pulses.

13. A modulator according to claim 4 in which the MOEMS device (11) comprises a micro-mirror (10) having the oscillation period.

14. A modulator according to claim 4 in which the MOEMS device comprises a Fabry-Perot etalon.

* * * * *